United States Patent
Kumar et al.

(10) Patent No.: US 8,869,272 B2
(45) Date of Patent: Oct. 21, 2014

(54) SYSTEM, METHOD, AND COMPUTER PROGRAM PRODUCT FOR PREVENTING A MODIFICATION TO A DOMAIN NAME SYSTEM SETTING

(75) Inventors: Lokesh Kumar, Chennai (IN); Harinath Vishwanath Ramachetty, Bangalore (IN); Nandi Dharma Kishore, Bangalore (IN)

(73) Assignee: McAfee, Inc., Santa Clara, CA (US)

(*) Notice: Subject to any disclaimer, the term of this patent is extended or adjusted under 35 U.S.C. 154(b) by 620 days.

(21) Appl. No.: 12/856,534

(22) Filed: Aug. 13, 2010

(65) Prior Publication Data

US 2013/0247183 A1    Sep. 19, 2013

(51) Int. Cl.
| G06F 11/00 | (2006.01) |
| G06F 12/14 | (2006.01) |
| G06F 12/16 | (2006.01) |
| G08B 23/00 | (2006.01) |

(52) U.S. Cl.
USPC .......................................................... 726/22

(58) Field of Classification Search
None
See application file for complete search history.

(56) References Cited

U.S. PATENT DOCUMENTS

| 5,987,610 | A |  | 11/1999 | Franczek et al. |
| 6,073,142 | A |  | 6/2000 | Geiger et al. |
| 6,460,050 | B1 |  | 10/2002 | Pace et al. |
| 7,506,155 | B1 |  | 3/2009 | Stewart et al. |
| 7,849,507 | B1 | * | 12/2010 | Bloch et al. ...................... 726/22 |
| 8,010,469 | B2 | * | 8/2011 | Kapoor et al. .................. 706/20 |
| 8,135,657 | B2 | * | 3/2012 | Kapoor et al. .................. 706/45 |
| 8,402,540 | B2 | * | 3/2013 | Kapoor et al. .................. 726/23 |
| 2007/0192863 | A1 | * | 8/2007 | Kapoor et al. .................. 726/23 |
| 2007/0261112 | A1 | * | 11/2007 | Todd et al. ....................... 726/11 |
| 2008/0028100 | A1 | * | 1/2008 | Adelman et al. .............. 709/245 |
| 2008/0133517 | A1 | * | 6/2008 | Kapoor et al. ..................... 707/6 |
| 2008/0133518 | A1 | * | 6/2008 | Kapoor et al. ..................... 707/6 |
| 2008/0134330 | A1 | * | 6/2008 | Kapoor et al. .................. 726/22 |
| 2008/0162390 | A1 | * | 7/2008 | Kapoor et al. .................. 706/20 |
| 2008/0262990 | A1 | * | 10/2008 | Kapoor et al. .................. 706/20 |
| 2011/0214157 | A1 | * | 9/2011 | Korsunsky et al. ............... 726/1 |
| 2012/0017262 | A1 | * | 1/2012 | Kapoor et al. .................... 726/1 |

OTHER PUBLICATIONS

CSL, An Analysis of Conficker, Mar. 19, 2009, SRI International.*
CSL, Conficker C P2P, Sep. 21, 2009, SRI International.*

* cited by examiner

*Primary Examiner* — Brian P Whipple
(74) *Attorney, Agent, or Firm* — Patent Capital Group

(57) ABSTRACT

A system, method, and computer program product are provided for preventing a modification to a domain name system setting. In use, an attempt to modify a domain name system setting is detected. Additionally, a source of the attempt and an attribute of the modification are verified. Further, the modification to the domain name system setting is prevented, based on the verification.

15 Claims, 5 Drawing Sheets

_US 8,869,272 B2_

SYSTEM, METHOD, AND COMPUTER PROGRAM PRODUCT FOR PREVENTING A MODIFICATION TO A DOMAIN NAME SYSTEM SETTING

FIELD OF THE INVENTION

The present invention relates to domain name system (DNS) settings, and more particularly to monitoring alterations of DNS settings.

BACKGROUND

Traditionally, security systems have been utilized for detecting and preventing various types of malware. Unfortunately, such security systems have generally exhibited various limitations in detecting and preventing malware that changes domain name system settings.

For example, traditional security systems may detect and address malicious domain name system changer malware only if the security systems have a signature for the malware executable. If the malware does not match a signature, it may be allowed to run on a machine undisturbed. Additionally, turnaround time involved in submitting a sample of domain name system changer malware to a security system and getting a response is significantly high. Further, cleaning performed by traditional security systems is often incomplete with respect to domain name system settings. There is thus a need for addressing these and/or other issues associated with the prior art.

SUMMARY

A system, method, and computer program product are provided for preventing a modification to a domain name system setting. In use, an attempt to modify a domain name system setting is detected. Additionally, at least one of a source of the attempt and an attribute of the modification are verified. Further, the modification to the domain name system setting is prevented, based on the verification.

DETAILED DESCRIPTION

Figure 1:
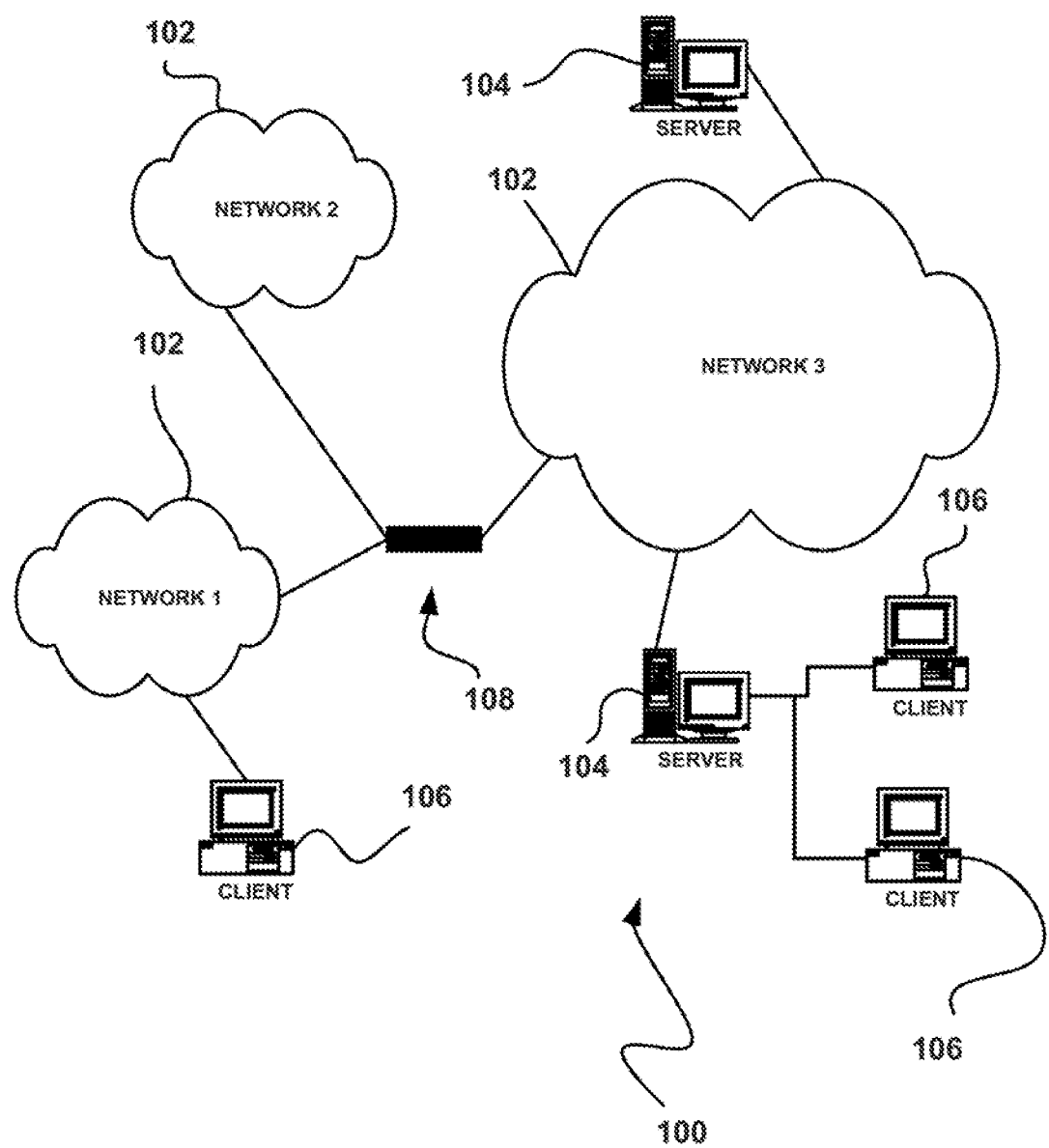
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
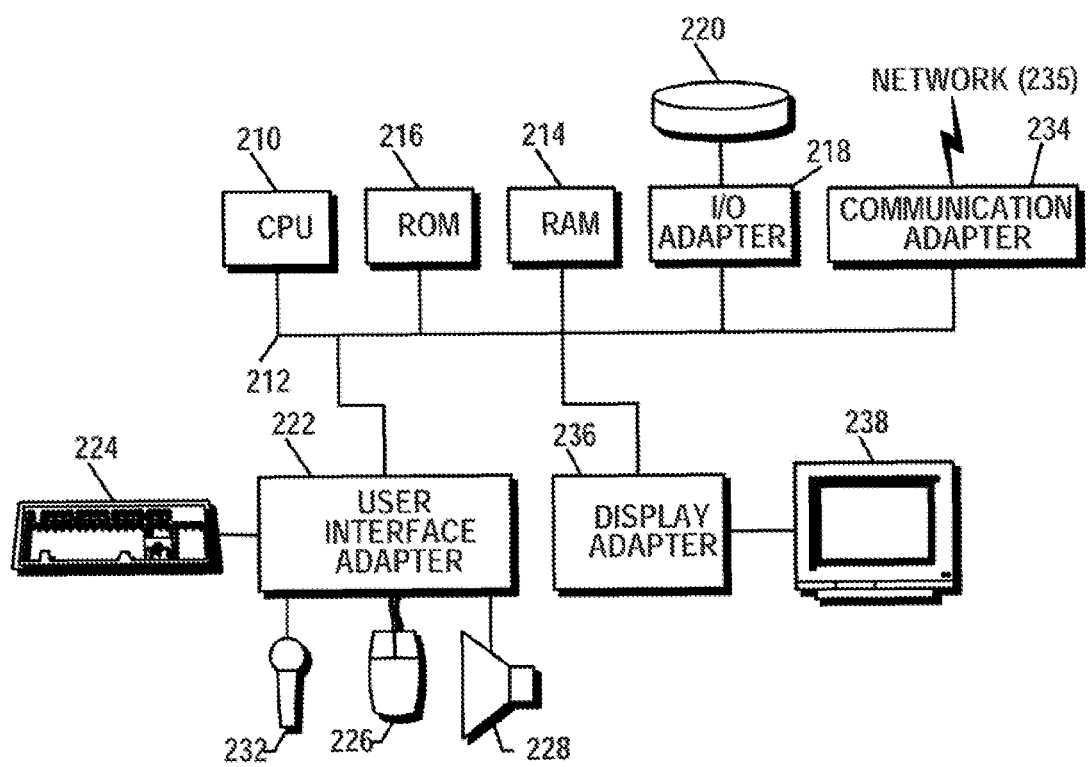
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting, the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
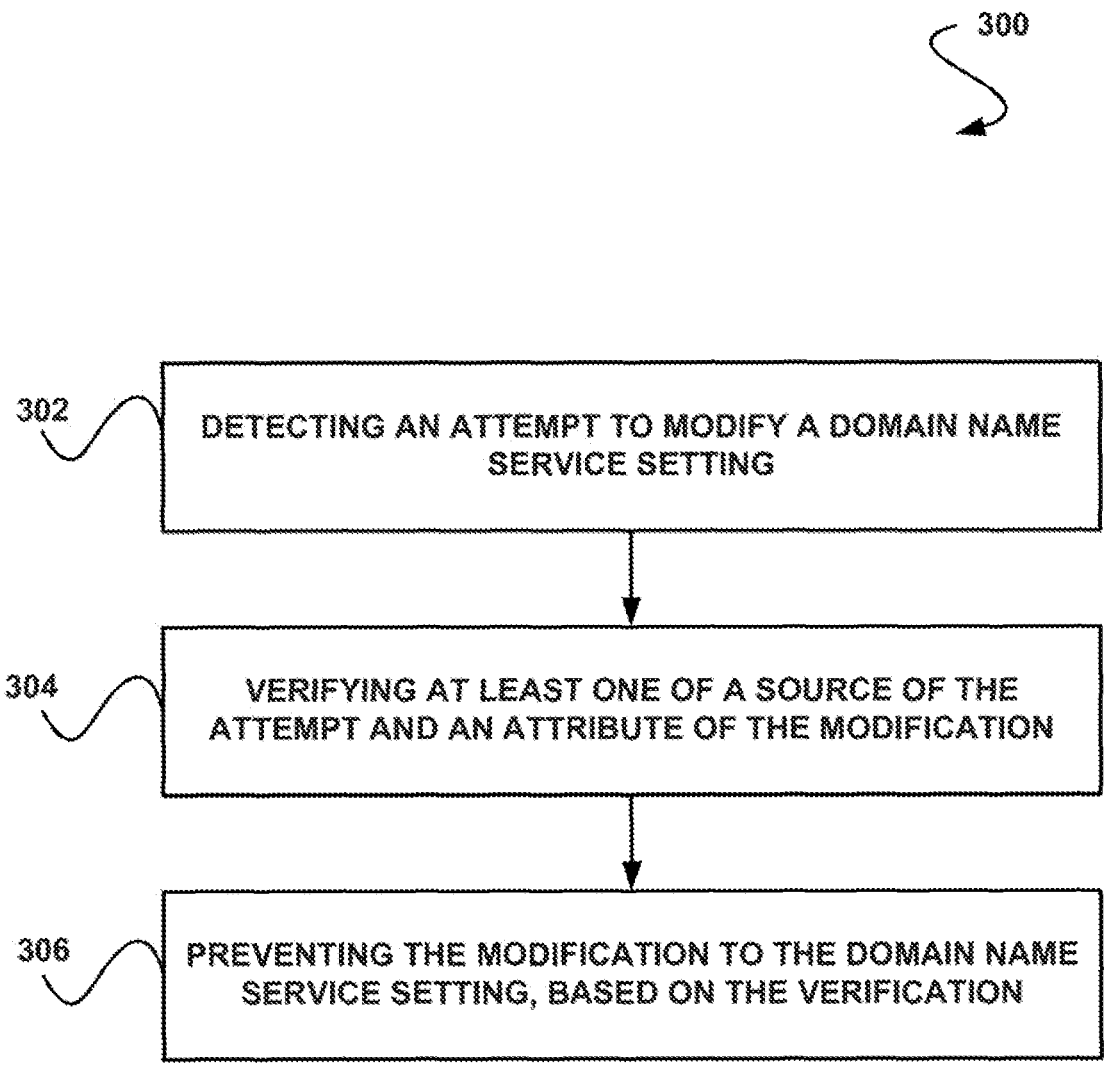
FIG. 3 shows a method for preventing a modification to a domain name system setting, in accordance with another embodiment.

FIG. 3 shows a method 300 for preventing a modification to a domain name system setting, in accordance with another embodiment. As an option, the method 300 may be carried out in the context of the architecture and environment of FIGS. 1 and/or 2. Of course, however, the method 300 may be carried out in any desired environment.

As shown in operation 302, an attempt to modify a domain name system setting is detected. In the context of the present description, the domain name system setting may include any setting associated with a domain name system. For example, the domain name system setting may include a setting of a value in a registry (e.g., a setting of a registry value in a registry key, etc.). In another example, the domain name system setting may include an internet protocol (IP) address setting. For instance, the attempt to modify the domain name system setting may include an attempt to change or replace an IP address to a malicious IP address.

Additionally, the attempt to modify a domain name system setting may be detected in any manner. In one embodiment, a computer on which the domain name system settings are established may be monitored. For example, a registry of the computer may be monitored for modifications to one or more registry values. In another example, the attempt to modify the domain name system setting may be intercepted. Additionally, in one embodiment, the attempt to modify the domain name system setting may include an attempted write operation. In another embodiment, the attempt to modify the domain name system setting may include an attempted create operation.

Additionally, as shown in operation 304, at least one of a source of the attempt and an attribute of the modification, are verified. In one embodiment, the source of the attempt may include a file. For example, the source of the attempt may include a process. Additionally, in one embodiment, the attribute of the modification may include a proposed change to the domain name service setting. For example, the attribute of the modification may include one or more new settings (e.g., a new IP address, etc.).

In another embodiment, verifying the source, of the attempt may include altering the source of the attempt. For example, verifying the source of the attempt may include hashing the source of the attempt. Additionally, in one embodiment, the source of the attempt may be verified by comparing the source of the attempt against one or more data structures. For example, the source of the attempt may be verified by comparing the source of the attempt against a whitelist containing known (e.g. predetermined) good sources. In another example, the source of the attempt may be verified by comparing the source of the attempt against a blacklist containing known at least potentially malicious sources, known malicious sources etc.

In yet another embodiment, the hash of the source of the attempt may be compared against the one or more data structures. For example, the hash of the source of the attempt may be compared against a list of hashes, where the list contains hashes of known good sources, known potentially malicious sources, known malicious sources, etc.

Also, in one embodiment, the attribute of the modification may be verified by comparing the attribute of the modification against one or more data structures. For example, the attribute of the modification may be verified by comparing the attribute of the modification against a whitelist containing known good attributes. In another example, the attribute of the modification may be verified by comparing the attribute of the modification against a blacklist containing known at least potentially malicious attributes, malicious attributes, etc.

In another embodiment, the verifying may occur at one or more servers. For example, the source of the attempt may be verified at one server, and the attribute of the modification may be verified at another server. In another example, both the source of the attempt and the attribute of the modification may be verified at a single server. Further still, the source of the attempt and the attribute of the modification may be verified by an external service and/or procedure (e.g., a separate verification service, etc.).

Further, as shown in operation 306, the modification to the domain name system setting is prevented, based on the verification. In one embodiment, the modification to the domain name system setting may be prevented if the source of the attempt cannot be verified. In another embodiment, the modification to the domain name system setting may be prevented if the source of the attempt is determined to be a malicious source or at least a potentially malicious source (e.g. based on, the aforementioned comparison(s)).

In yet another embodiment, the modification to the domain name system setting may be prevented if the attribute of the modification cannot be verified. Additionally, in one embodiment, the modification to the domain name system setting May be prevented if the attribute of the modification is determined to be a malicious attribute or at least a potentially malicious attribute.

Further still, the modification to the domain name system setting may be prevented by notifying a user. For example, if the source of the attempt is determined to be a malicious source or, at least potentially a malicious source, or the attribute of the modification is determined to be a malicious attribute or at least a potentially malicious attribute, then a user may be notified of the malicious activity.

Additionally, in one embodiment, a user action may be requested. For example, the user's permission to allow or deny the modification to the domain name system setting may be requested if the source of the attempt is determined to be a malicious source or at least potentially a malicious source, or the attribute of the modification is determined to be a malicious attribute or at least a potentially malicious attribute.

Further, in one embodiment, preventing the modification to the domain name system setting may include blocking the modification to the domain name system setting. For example, a requested registry write event may be completely blocked, partially blocked, etc.

Also, in one embodiment, preventing the modification to the domain name system setting, may include undoing the modification to the domain name system setting. For example, if the source of the attempt is determined to be a malicious source or at least potentially a malicious source, or the attribute of the modification is determined to be a malicious attribute or at least a potentially malicious attribute, and the modification to the domain name system setting has already occurred, the modification may be undone (e.g., utilizing backup information, etc.).

Further, in another embodiment, preventing the modification to the domain name system setting may include removing the source of the attempt. For example, if the source of the attempt is determined to be a malicious source or at least potentially a malicious source, or the attribute of the modification is determined to be a malicious attribute or at least a potentially malicious attribute, the source of the attempt may be deleted, quarantined, repaired, etc. Of course, it should be noted that the modification may be allowed if the source of the attempt and/or attribute of the modification are verified (e.g. as being included in a whitelist, etc).

In this way, malicious modification to the domain name system may be avoided based on behavior detection. Additionally, both the source of the attempt and the modification to the domain name system setting may be addressed. Further, any vulnerability caused by the attempt to modify the domain name service setting may be eliminated even after the source of the attempt has been removed.

Figure 4:
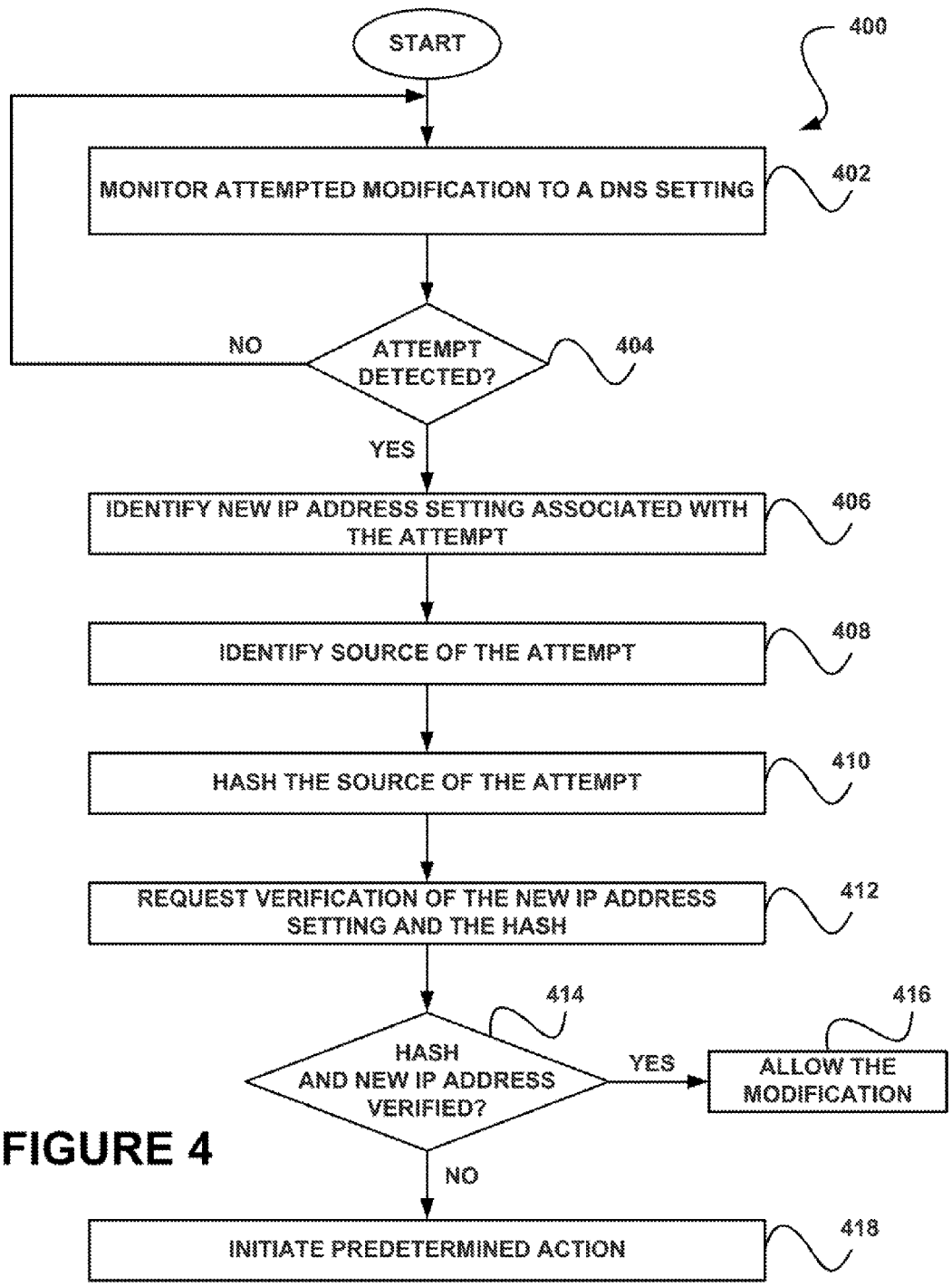
FIG. 4 shows a method for monitoring an attempted modification to a domain name system setting, in accordance with yet another embodiment.

FIG. 4 shows a method 400 for monitoring an attempted modification to a domain name system setting, in accordance with another embodiment. As an option, the method 400 may be carried out in the context of the architecture and environment of FIGS. 1-3. Of course, however, the method 400 may be carried out in any desired environment.

As shown in operation 402, an attempted modification to a domain name system setting is monitored. In one embodiment, a registry of a user's computer may be monitored for any attempted modifications to the domain name system settings. For example, a registry key such as HKEY_LOCAL_MACHINE\SYSTEM\Current ControlSet\Services\Tcpip\Parameters may be monitored for a write operation or a create operation to one or more registry values (e.g., "DhcpNameServer," "NameServer," etc.).

Additionally, in decision 404, it is determined whether an attempt to modify a domain name system setting has been detected. For example, it may be determined whether a write or create operation has been intercepted for a registry value in the registry key. If in decision 404 an attempt is not detected, the attempted modification to a domain name system setting is monitored again in operation 402.

However, if in decision 404 an attempt to modify a domain name system setting is detected, in operation 406 a new IP address setting associated with the attempt is identified. In one embodiment, the new IP address setting may redirect a computer to a new website when a website is loaded. For example, the attempt to modify the domain name system setting may include an attempt to change or create an IP address setting of a user computer to a different value (e.g., to a malicious IP address, etc.) in a registry of a user computer, such that when the user visits a website, the new domain name system settings redirect the user to another site (e.g., a preconfigured malicious site, etc.).

In one embodiment, the new IP address setting associated with the attempt may include a uniform resource locator (URL). For example, the URL may include a URL of a malicious web site and may be intended to replace an existing URL in the registry. Additionally, in another embodiment, the new IP address setting associated with the attempt may include an IP address. For example, the IP address may include an IP address of a malicious system, web site, etc. and may be intended to replace an existing IP address in the registry. In yet another embodiment, the new IP address setting associated with the attempt may be intercepted with the attempt to modify the domain name system setting.

Additionally, as, shown in operation 408, a source of the attempt is identified. In one embodiment, the source of the attempt may include the file or program that is responsible for the attempted modification to the domain name system setting. In another embodiment, the source of the attempt may be identified by tracing the attempt. In yet another embodiment, the source of the attempt may be identified by identifying currently running one or more currently running applications. Of course, however, the source of the attempt may be identified in any manner. It should be noted that while both the new IP address setting and the source are shown as being identified in operations 406 and 408 respectively, one may optionally only be identified if the other is not verified (in the manner described below with respect to decision 414). Thus, for example, in an embodiment not presently shown, the source and IP address setting may be verified separately, such that only when verification of one fails is the other attempted to verified.

Further, as shown in operation 410, the source of the attempt is hashed. In one embodiment, a hash may be created using the file or program that initiated the attempted modification to the domain name system setting. Of course, however, the source of the attempt may be hashed in any manner.

Further still, as shown in operation 412, verification of the new IP address setting and the hash of the source of the attempt is requested. In one embodiment, a query may be sent to an external verification entity including the new IP address setting. For example, the new IP address associated with the attempt may be sent to an IP verification server. In another embodiment, another query may be sent to another external verification entity including the hash of the source of the attempt. For example, the hash of the source of the attempt may be sent to a source verification server. In another embodiment, both the new IP address setting and the hash of the source of the attempt may be sent to the same verification server.

In addition, as shown in decision 414, it is determined whether the new IP address setting and the hash of the source of the attempt are verified. For example, if the one or more verification entities received verification queries including the new IP address setting and the hash of the source of the attempt, the verification entities may return the results of the verification, where such results may include verified (e.g., an indication that the new IP address setting and the hash of the source of the attempt are good), not verified (e.g., an indication that the new IP address setting and/or the hash of the source of the attempt are at least potentially malicious), etc.

Further, if in decision 414 it is determined that the new IP address setting and the hash of the source of the attempt are verified, then in operation 416 the attempted modification to the domain name system setting is allowed. For example, if a program attempted to modify an IP address of a registry with a new IP address, and both the program and the new IP address are verified by a verification entity as being good, then the IP address of the registry will be modified with the new IP address and such modification will be allowed. Additionally, in one embodiment, user permission to allow or deny the attempted modification to the domain name system setting may be requested (e.g., via a graphical user interface (GUI), etc.).

However, if in decision 414 it is determined that the new IP address setting and the hash of the source of the attempt are not verified, then in operation 416 a predetermined action is initiated. In one embodiment, the predetermined action may include terminating the source of the attempt. In another embodiment, the predetermined action may include prompting a user to delete, rename, or quarantine the source of the attempt. In yet another embodiment, the predetermined action may include preventing the attempted modification to the domain name system setting from being implemented (e.g., by blocking a write to the registry, etc.).

In still another embodiment, the predetermined action may include undoing a modification to the domain name system setting. For example, the attempted modification to the domain name system setting may be provisionally allowed for performance reasons, and a backup of old domain name system settings may be created before the attempted modification to the domain name system setting is provisionally allowed. Therefore, the provisionally allowed modification to the domain name system setting may then be undone or removed, and the backup of old domain name system settings may be restored.

Figure 5:
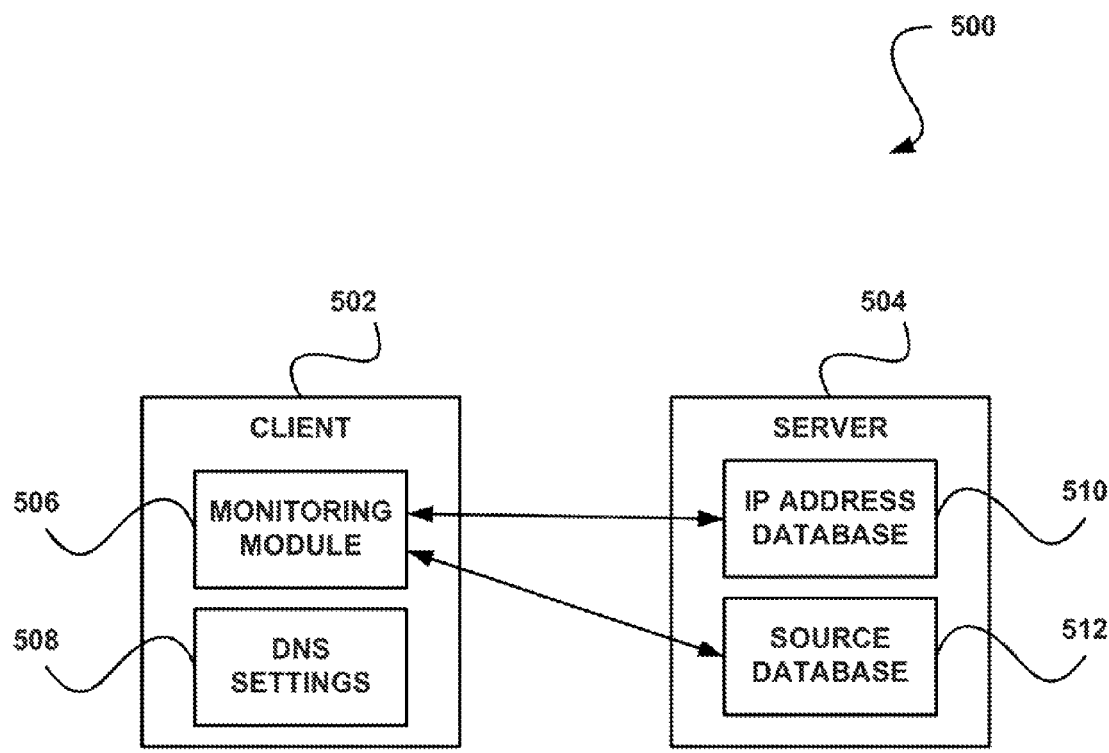
FIG. 5 shows a system for monitoring and verifying an attempted modification to a domain name system setting, in accordance with still yet another embodiment.

FIG. 5 shows a system 500 for monitoring and verifying an attempted modification to a domain name system setting, in accordance with another embodiment. As an option, the system 500 may be carried out in the context of the architecture and environment of FIGS. 1-4. Of course, however, the system 500 may be carried out in any desired environment.

As shown, the system 500 includes a monitoring module 506 located on the client 502. In one embodiment, the client 502 may include a client computer. In another embodiment, the client 502 may include a plurality of client computers. Additionally, in one embodiment, the monitoring module 506 may include a software program or a plurality of software programs. In another embodiment, the monitoring module 506 may be part of one or more elements of security software installed on the client 502.

Further, the client 502 includes DNS settings 508. For example, the DNS settings 508 may be found in a registry of the client 502. In one embodiment, the monitoring module 506 may monitor the DNS settings 508 in order to intercept any request to change the DNS settings 508. In another embodiment, if a request to change the DNS settings 508 is intercepted by the monitoring module 506, the monitoring module 506 may determine a source of the request to change the DNS settings 508 as well as a new IP address that is part of the request to change the DNS settings 508. For example, the monitoring module 506 may intercept a request from the source to change a current IP address of the DNS settings 508 to the new IP address.

Also, the system 500 includes a server 504 that contains an IP address database 510 and a source database 512. In one embodiment, the server 504 may include a security services server. For example, the server 504 may include a verification server. Additionally, in one embodiment, the IP address database 510 may include one or more data structures storing IP address data. For example, the IP address database 510 may include one or more lists of IP addresses.

In one embodiment, the IP address database 510 may include a whitelist that includes a list of known good (e.g., safe, trustworthy, reliable, etc.) IP addresses. In another embodiment, the IP address database 510 may include a blacklist that includes a list of known bad (e.g., at least potentially malicious, malicious, malware-based, potentially suspicious, etc.) IP addresses. Additionally, in one embodiment, the IP address database 510 may be constantly and/or dynamically updated. For example, the IP address database 510 may receive updates from one or more computers when new known good or bad IP addresses are determined.

Additionally, the source database 512 may include one or more data structures storing source data. For example, the source database 512 may include one or more lists of source files. In another embodiment, the source database 512 may include one or more data structures storing hashes of files. For example, the source database 512 may include one or more lists of hashes of source files.

In one embodiment, the source database 512 may include a whitelist that includes a list of known good (e.g., safe, trustworthy, reliable, etc.) source files. In another embodiment, the source database 512 may include a blacklist that includes a list of known bad (e.g., at least potentially malicious, malicious, malware-based, etc.) source files. Additionally, in one embodiment, the source database 512 may be constantly and/or dynamically updated. For example, the source database 512 may receive updates from one or more computers when new known good or bad source files are determined.

Further, in one embodiment, the IP address database 510 and/or the source database 512 may be managed by a security service. In another embodiment, the IP address database 510 and/or the source database 512 may be cloud based. For example, the IP address database 518 and/or the source database 512 may be implemented using cloud computing.

Further still, in one embodiment, the monitoring module 506 may query the IP address database 510 and the source database 512 at the server 504. For example, the monitoring module 506 may query the IP address database 510 with the determined new IP address that is part of the intercepted request to change the DNS settings 508. Additionally, in another example, the monitoring module 506 may query the source database 512 with the determined source of the request to change the DNS settings 508. In another embodiment, the monitoring module 506 may hash the determined source of the request to change the DNS settings 508, and may query the source database 512 with the hash of the determined source of the request to change the DNS settings 508.

Also, in one embodiment, in response to the query from the monitoring module 506, the IP address, database 510 and the source database 512 may perform one or more verification actions and return the results to the monitoring module 506. For example, in response to receiving the query from the monitoring module 506 with the determined new IP address that is part of the intercepted request to change the DNS settings 508, the IP address database 510 may compare the new IP address to one or more data structures in the IP address database 510 (e.g., a whitelist, a blacklist, etc.).

Additionally, in one embodiment, in response to the comparison, the IP address database 510 may return an indication as to whether the new IP address is good or bad. For example, if the new IP address is found on the IP address whitelist, the IP address database 510 may return an indication to the monitoring module 506 that the new IP address is good. However, in another example, if the new IP address is found on the IP address blacklist, the IP address database 510 may return an indication to the monitoring module 506 that the new IP address is bad.

In another example, in response to receiving the query from the monitoring module 506 with a hash of the determined source of the request to change the DNS settings 508, the source database 512 may compare the hash of the source of the request to one or more data structures in the source database 512 (e.g., a whitelist, a blacklist, etc.). Additionally, in response to the comparison, the source database 512 may return an indication as to whether the source is good or bad. For example, if the hash of the source of the request is found on the file hash whitelist, the source database 512 may return an indication to the monitoring module 506 that the hash of the source of the request is good. However, in another example, if the hash of the source of the request is found on the file hash blacklist, the source database 512 may return an indication to the monitoring module 506 that the hash of the source of the request is bad.

In yet another embodiment, the monitoring module 506 may first query the source database 512 at the server 504 with the hash of the determined source of the request to change the DNS settings 508. Additionally, the monitoring module 506 may then query the IP address database 510 at the server 504 with the determined new IP address that is part of the intercepted request to change the DNS settings 508 only if the source database 512 returns an indication to the monitoring module 506 that the hash of the source of the request is good. However, if the source database 512 returns an indication to the monitoring module 506 that the hash of the source of the request is bad, the monitoring module 506 may not then query the IP address database 510 at the server 504.

Further, in one embodiment; the monitoring module 506 may perform one or more actions at the client 502, based on the response of the IP address database 510 and the source database 512 to the query from the monitoring module 506. For example, if the IP address database 510 returns an indication to the monitoring module 506 that the new IP address is good, and the source database 512 returns an indication to the monitoring module 506 that the source is good, then the monitoring module 506 may allow the intercepted request to change the DNS settings 508.

However, if the IP address database 510 returns an indication to the monitoring module 506 that the new IP address is bad, or the source database 512 returns an indication to the monitoring module 506 that the source is bad, then the monitoring module 506 may deny the intercepted request to change the DNS settings 508, stop and/or delete the determined source of the request to change the DNS settings 508, reinstate old settings in the DNS settings 508, notify a user associated with the client 502, or perform any other security action.

In this way, the monitoring module 506 may prevent unauthorized changes to the DNS settings 508, based on verification performed at the server 504 by the IP address database 510 and the source database 512.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. At least one non-transitory tangible computer readable storage medium having instructions stored thereon, the instructions when executed on a machine cause the machine to:
   - detect an attempt for modification of a domain name system setting;
   - identify an attribute of the modification;
   - verify a source of the attempt by executing a hash in order to compare the source against a whitelist that includes predetermined non-malicious sources;
   - verify the attribute of the modification by comparing the attribute of the modification against at least one of a whitelist containing known good attributes and a blacklist containing known at least potentially malicious attributes;
   - prevent the modification to the domain name system setting when the verifying of the source of the attempt is indicative that the source is a potentially malicious source and the verifying of the attribute of the modification is indicative that the attribute of the modification is a potentially malicious attribute.

2. The computer readable storage medium of claim 1, wherein the domain name system setting includes a setting of a value in a registry.

3. The computer readable storage medium of claim 1, wherein the domain name system setting includes an Internet Protocol (IP) address setting.

4. The computer readable storage medium of claim 1, wherein the attempt to modify the domain name system setting includes an attempt to change or replace an internet protocol (IP) address to a malicious IP address.

5. The computer readable storage medium of claim 1, wherein the computer program product is operable such that the attempt to modify the domain name system setting is intercepted.

6. The computer readable storage medium of claim 1, wherein the source of the attempt includes a process.

7. The computer readable storage medium of claim 1, wherein the source of the attempt is verified by comparing the source of the attempt against one or more data structures.

8. The computer readable storage medium of claim 1, wherein the source of the attempt is verified by comparing the source of the attempt against a blacklist containing known at least potentially malicious sources.

9. The computer readable storage medium of claim 1, wherein the attribute of the modification is verified by comparing the attribute of the modification against one or more data structures.

10. The computer readable storage medium of claim 1, wherein the computer program product is operable such that the source of the attempt is verified at one server, and the attribute of the modification is verified at another server.

11. The computer readable storage medium of claim 1, wherein the computer program product is operable such that both the source of the attempt and the attribute of the modification are verified at a single server.

12. The computer readable storage medium of claim 1, wherein the modification to the domain name system setting is prevented if the source of the attempt is determined to be a malicious source or at least a potentially malicious source.

13. A method to be performed by a computer that includes a processor and a memory, comprising:
   - detecting an attempt for modification of a domain name system setting;
   - identifying an attribute of the modification;
   - verifying a source of the attempt by executing a hash in order to compare the source against a whitelist that includes predetermined non-malicious sources;
   - verifying the attribute of the modification by comparing the attribute of the modification against at least one of a whitelist containing known good attributes and a blacklist containing known at least potentially malicious attributes;
   - preventing the modification to the domain name system setting when the verifying of the source of the attempt is indicative that the source is a potentially malicious source and the verifying of the attribute of the modification is indicative that the attribute of the modification is a potentially malicious attribute.

14. A system, comprising:
   a processor; and
   a memory, wherein the system is configured for:
   - detecting an attempt for modification of a domain name system setting;
   - identifying an attribute of the modification;
   - verifying a source of the attempt by executing a hash in order to compare the source against a whitelist that includes predetermined non-malicious sources;
   - verifying the attribute of the modification by comparing the attribute of the modification against at least one of a whitelist containing known good attributes and a blacklist containing known at least potentially malicious attributes;
   - preventing the modification to the domain name system setting when the verifying of the source of the attempt is indicative that the source is a potentially malicious source and the verifying of the attribute of the modification is indicative that the attribute of the modification is a potentially malicious attribute.

15. The system of claim 14, wherein the processor is coupled to the memory via a bus.

* * * * *